United States Patent
Kudo

(10) Patent No.: US 8,355,037 B2
(45) Date of Patent: *Jan. 15, 2013

(54) OPTICAL ELEMENT USED IN OPTICAL SCANNING APPARATUS AND OPTICAL SCANNING APPARATUS USING SAME

(75) Inventor: Genichiro Kudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

This patent is subject to a terminal disclaimer.

(21) Appl. No.: 13/046,204

(22) Filed: Mar. 11, 2011

(65) Prior Publication Data

US 2011/0229205 A1  Sep. 22, 2011

(30) Foreign Application Priority Data

Mar. 16, 2010 (JP) ................................ 2010-059170

(51) Int. Cl.
*B41J 15/14* (2006.01)
*B41J 27/00* (2006.01)
*G02B 26/08* (2006.01)
*G02B 27/44* (2006.01)

(52) U.S. Cl. ..... 347/258; 347/244; 347/259; 359/205.1; 359/207.7; 359/566

(58) Field of Classification Search .......... None
See application file for complete search history.

(56) References Cited

U.S. PATENT DOCUMENTS

| 6,067,106 A * | 5/2000 | Ishibe et al. ............... 347/258 |
| 6,094,286 A | 7/2000 | Kato |
| 6,208,450 B1 * | 3/2001 | Toyoda ..................... 359/205.1 |
| 6,215,574 B1 * | 4/2001 | Toyoda ..................... 359/207.1 |
| 6,829,093 B1 | 12/2004 | Nakai |
| 2007/0253048 A1 | 11/2007 | Sakai |
| 2007/0285755 A1 * | 12/2007 | Ichihashi et al. ............... 359/205 |

FOREIGN PATENT DOCUMENTS

| JP | 10-068903 A | 3/1998 |
| JP | 2001-042112 A | 2/2001 |
| JP | 2001-129714 A | 5/2001 |
| JP | 2007-293182 A | 11/2007 |

* cited by examiner

*Primary Examiner* — Matthew Luu
*Assistant Examiner* — Kendrick Liu
(74) *Attorney, Agent, or Firm* — Canon U.S.A., Inc. IP Division

(57) ABSTRACT

An optical element used in an optical scanning apparatus includes a diffracting surface composed of a diffraction grating. The diffracting surface includes a diffraction grating having a sectional shape linearly formed. If diffraction power in a main scanning direction on the diffracting surface received by an axial light flux is φDO and refractive power in the main scanning direction on a refracting surface on which the diffraction grating is formed received by the axial light flux is φref, the optical element satisfies the following conditions:

$$0 < \phi DO < 1.8 \times 10^{-3} (1/\text{mm}), \text{ and}$$

$$0.5|\phi DO| < |\phi ref| < 1.5|\phi DO|,$$

where the diffraction power φDO and the refractive power φref have opposite signs.

10 Claims, 13 Drawing Sheets

GRATING SHAPE NEAR M1

(DESIGNED SHAPE - MACHINED SHAPE) NEAR M1

OPTICAL ELEMENT USED IN OPTICAL SCANNING APPARATUS AND OPTICAL SCANNING APPARATUS USING SAME

BACKGROUND OF THE INVENTION

1. Field of the Invention

The present invention relates to an optical element used in an optical scanning apparatus and an optical scanning apparatus using such an optical element, and in particular, relates to an optical element suitable for use in an image forming apparatus such as a laser beam printer having an electrophotographic process, a digital copying machine, and a multifunction printer.

2. Description of the Related Art

Providing a diffraction grating on an entrance or exit surface of a curved refractive optical element to reduce chromatic aberration of a common optical system and to reduce degradation in optical performance due to environmental variations has been known. This method uses a physical phenomenon that chromatic aberration with respect to a light beam of a given reference wavelength appears in the opposite directions on a refracting surface and a diffracting surface of an optical system. Further, the fact that a great effect of reducing aberrations other than chromatic aberration of, for example, an aspherical lens can be achieved by changing the pitch of a periodic structure in a grating portion of the diffraction grating has been known (see Japanese Patent Application Laid-Open No. 2001-42112).

Particularly, an optical scanning apparatus used in an image forming apparatus such as a laser beam printer and digital copying machine guides a light flux emitted from a light source unit into a light deflector as a deflecting unit by an incident optical system. Then, an image forming optical system (fθ optical system) is caused to form an image of the light flux deflected and scanned by the light deflector on a photosensitive drum surface serving as a surface to be scanned like spots for optical scanning by the light flux on the photosensitive drum surface.

In such an optical scanning apparatus, a light flux emitted from the light source unit is converted into a parallel light flux by a collimator lens or the like and a linear image of the light flux converted into the parallel light flux to make a surface tilt error correction on a deflecting surface of a light deflector by a cylindrical lens. Then, the light flux deflected on the deflecting surface of the light deflector makes a constant-speed scan on the photosensitive drum surface by an image forming optical system to form spots.

Also in such an optical scanning apparatus, an incident optical system and an image forming optical system (image forming lens system) cause a light flux to converge or diverge by using a refractive optical element or a diffractive optical element (diffraction grating). If a diffractive optical element is used, an effect like an aspherical lens can be caused by changing the pitch of a periodic structure in the diffractive optical element so that an effect of significantly reducing aberrations and reducing degradation in optical performance due to environmental variations can be achieved.

However, while one light beam is also one light beam after diffraction on a refracting surface of a refractive optical element, light is divided depending on the diffraction order in diffraction on a diffracting surface of a diffractive optical element. Thus, if a diffractive optical element is used as an image forming optical system, it is necessary to set a specific order (design diffraction order) for the wavelength used. In addition, it is necessary to determine the shape of grating so that one light beam concentrated on the design diffraction order is generated. Further, if the shape of grating of the grating portion deviates from the desired shape, light beams of diffraction orders other than the design diffraction order are generated. This deviation from the desired shape of grating can lead to the generation of ghost light. Moreover, phase shifts with respect to a desired wave front (wave front aberrations) are caused and the peak quantity of light is reduced, which may prevent high-definition image formation. Therefore, it is necessary to carefully design and produce an image forming optical system using a diffractive optical element so that the shape of grating of the grating portion becomes the desired shape.

Various optical scanning apparatuses using a diffractive optical element have been proposed. See, for example, Japanese Patent Application Laid-Open No. 10-68903, Japanese Patent Application Laid-Open No. 2001-129714, and Japanese Patent Application Laid-Open No. 2007-293182.

In an optical scanning apparatus discussed in Japanese Patent Application Laid-Open No. 10-68903, a technology to optimize refractive power and diffraction power to correct changes in optical performance in the main scanning direction attendant on environmental variations is discussed. In an optical scanning apparatus discussed in Japanese Patent Application Laid-Open No. 2001-129714, a technology to process an elliptical diffraction grating at high speed with high definition. In an optical scanning apparatus discussed in Japanese Patent Application Laid-Open No. 2007-293182, a technology to reduce degradation in optical performance due to temperature changes by forming a stepped diffracting surface to be rotated in an incident optical system.

In a scanning optical system (optical scanning apparatus) having an elliptical diffraction grating whose diffracting surface is formed in a serrated shape, the grating (grating portion) (M0) on an optical axis is generally processed into a shape defined by a phase function, but slopes of other portions of the grating portion are formed linear due to restrictions of molding.

In an optical element formed based on general rotational symmetry as discussed in Japanese Patent Application Laid-Open No. 2001-42112, the shape of a grating portion as defined by a phase function is formed by bringing the tip of a cutting tool into contact with a work and continuously changing the cutting tool in the height direction while rotating the work.

Since it takes a long time to machine a diffraction grating in a conventional common diffractive optical element, an issue of lower accuracy of finishing is caused due to changes in ambient temperature and vibration of finishing machines.

However, if slopes of a grating portion are machined linear to reduce the machining time of a diffraction grating, a new issue arises that degradation in optical performance is caused due to shifts of a machined diffraction grating from a designed ideal diffraction grating.

In an optical system in which diffraction power of the diffraction grating (diffractive optical element) is weak, the grating pitch of a grating portion formed on the diffracting surface in a serrated shape becomes wider. Thus, if the method of linearly machining slopes of the grating portion is used, an error (machining error) deviating from the desired shape of the grating portion becomes greater. If an error of the shape of the grating portion of the diffraction grating becomes greater, a shift (wave front aberration) with respect to the wave front phase to be provided on the designed diffracting surface becomes larger, causing an issue that it becomes difficult to obtain desired optical characteristics due to lowering of a modulation transfer function (MTF) and degraded spots. Particularly when an elliptical diffraction grating is formed, it is difficult to machine the sectional shape of a diffracting surface (slope) as a curve, causing an issue of a greater error.

SUMMARY OF THE INVENTION

The present invention is directed to an optical element for which a diffraction grating can be produced in a short time and in which a phase error (spot degradation) is minimized even if the sectional shape of a diffracting surface of the diffraction grating is linearly machined. An optical scanning apparatus using the optical element is also disclosed.

According to an aspect of the present invention, an optical element used in an optical scanning apparatus includes a diffracting surface composed of a diffraction grating, wherein the diffracting surface includes a diffraction grating whose sectional shape of the diffracting surface is linearly formed, and wherein, if diffraction power in a main scanning direction on the diffracting surface received by an axial light flux is φDO and refractive power in the main scanning direction on a refracting surface on which the diffraction surface is formed received by the axial light flux is φref, the optical element satisfies the following conditions:

$$0 < \phi DO < 1.8 \times 10^{-3} (1/mm), \text{ and}$$

$$0.5|\phi DO| < |\phi ref| < 1.5|\phi DO|,$$

where the diffraction power φDO and the refractive power φref have opposite signs.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

First Embodiment

Figure 1:
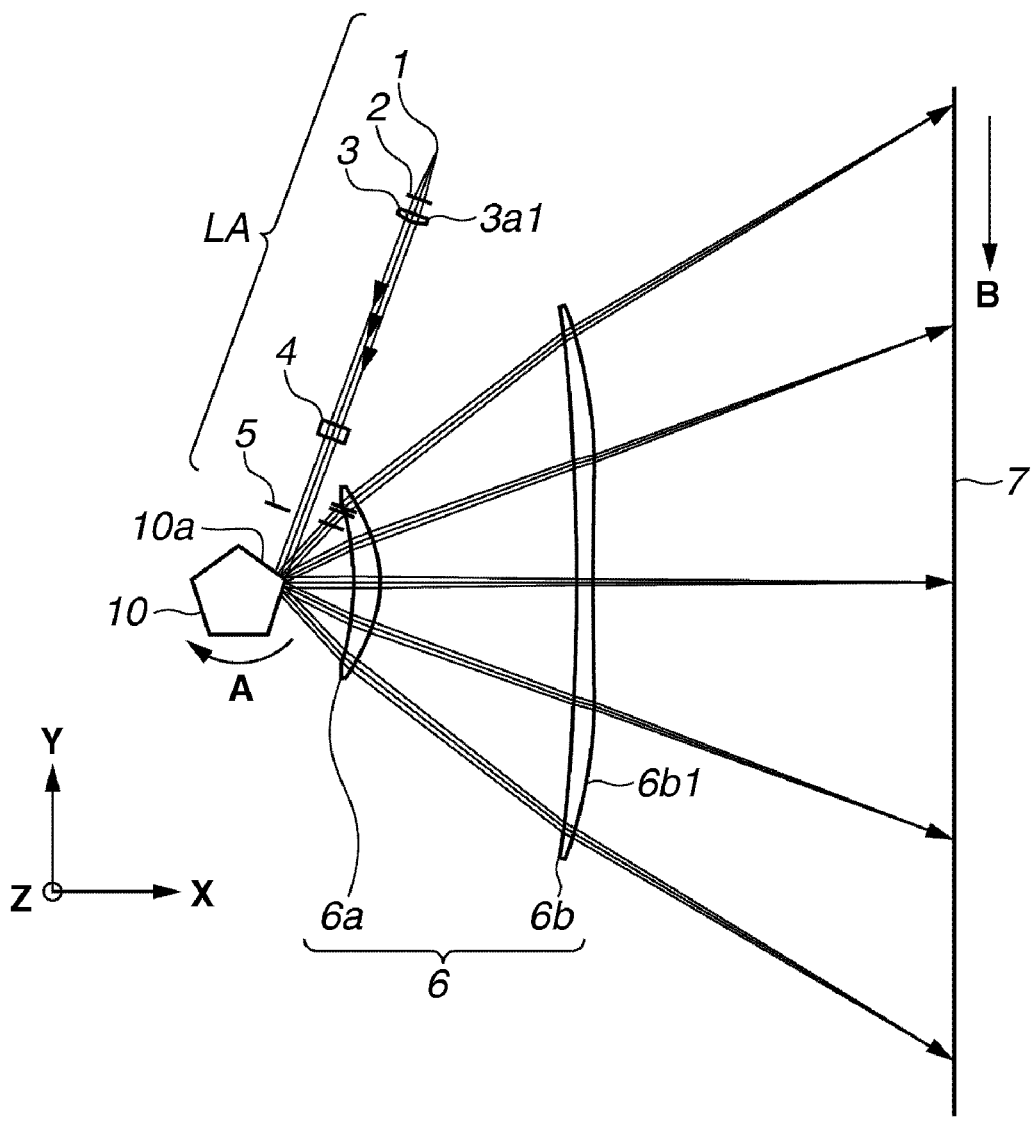
FIG. 1 is a main scanning sectional view of an optical scanning apparatus including an optical element according to first, second, and third exemplary embodiment of the present invention.
Figure 2:
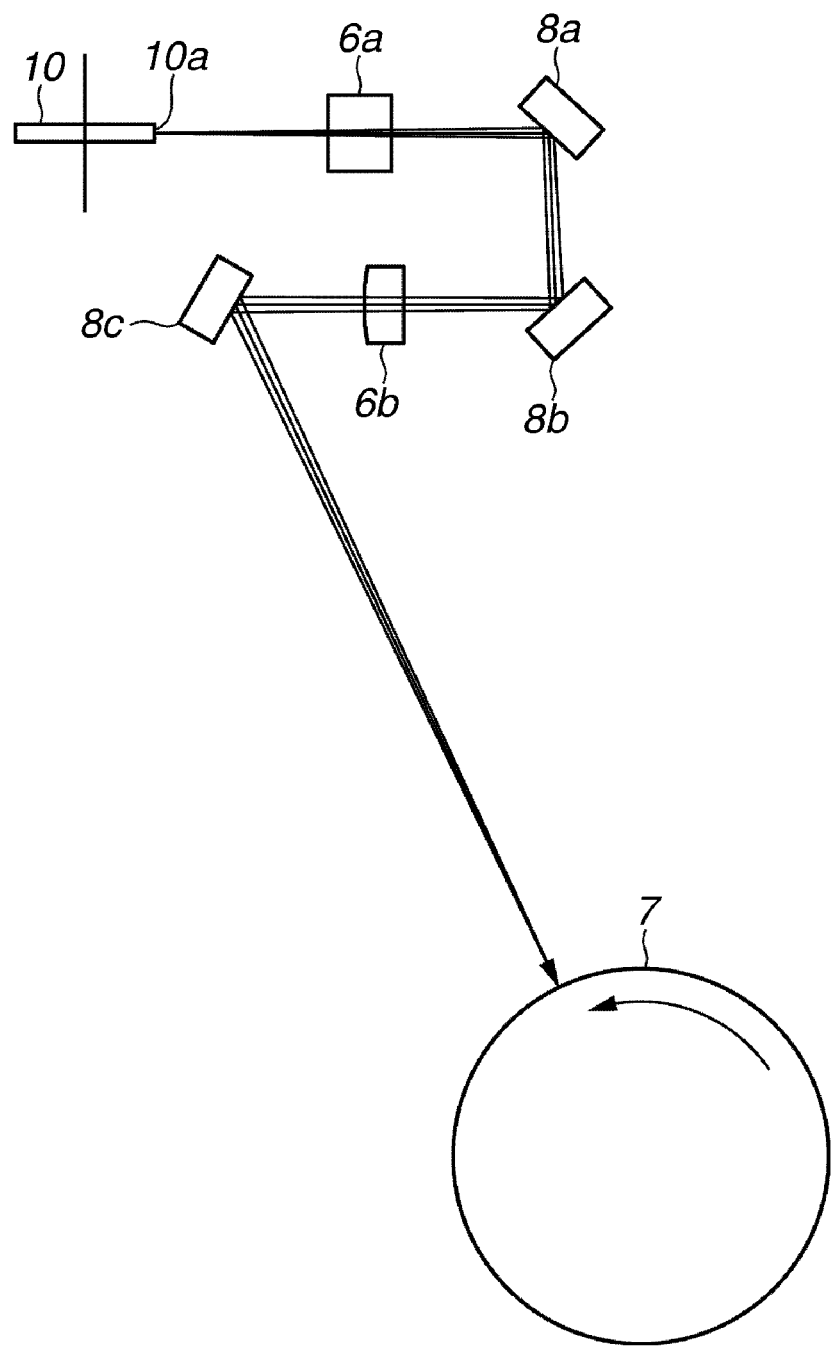
FIG. 2 is a sub-scanning sectional view of an optical scanning apparatus including an optical element according to the first exemplary embodiment.

FIG. 1 is a sectional view of portions of an optical scanning apparatus in a main scanning direction (main scanning sectional view) according to a first exemplary embodiment of the present invention, and FIG. 2 is a sectional view of portions in a sub-scanning direction (sub-scanning sectional view) according to the first exemplary embodiment.

In the description below, the sub-scanning direction (Z direction) is a direction parallel to a rotation axis of a deflecting unit. The main scanning section is a section whose normal is in the sub-scanning direction (direction parallel to the rotation axis of the deflecting unit). The main scanning direction (Y direction) is a direction in which a light flux deflected and scanned by the deflecting unit is projected onto the main scanning section. The sub-scanning section is a section whose normal is in the main scanning direction.

Figure 3:
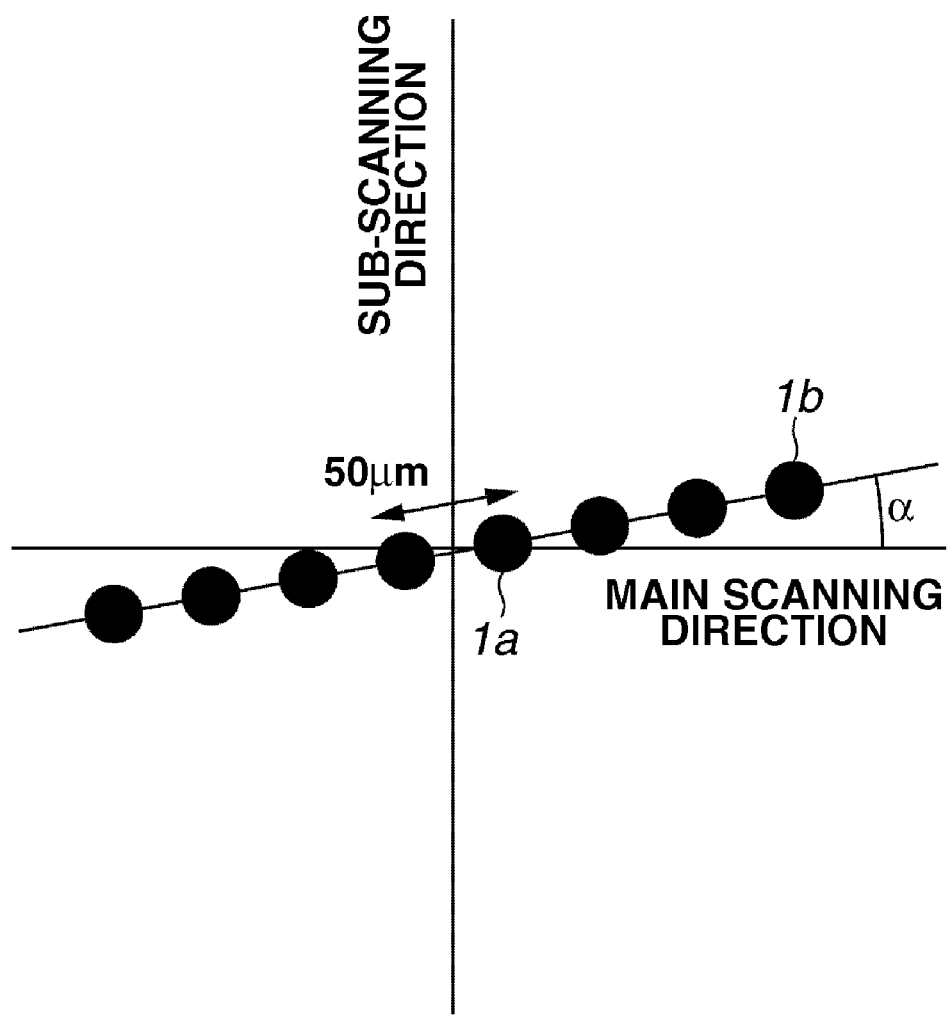
FIG. 3 is a schematic diagram of a light source unit according to the first exemplary embodiment.

A light source unit 1 in FIG. 1 is composed of, for example, a semiconductor laser (wavelength λ=670 nm) having eight light emitting points (light emitting portions). The semiconductor laser 1 limits fluctuations in wavelength of the eight light emitting points to within 1.5 nm to reduce degradation in optical performance due to chromatic aberrations of an optical system. At least one light emitting point of a plurality of light emitting points of the semiconductor laser 1 is located at a distance from an optical axis of the collimator lens 3 different that the distance of other one light emitting point from the optical axis. In the present exemplary embodiment, as illustrated in FIG. 3, plural light emitting points such as 1a and 1b are placed one-dimensionally as a linear array that is inclined by an angle α with respect to the main scanning direction. The linear array of light emitting points can be implemented, for example, by a semiconductor laser composed of eight light emitting points. The number of light emitting points is not limited to eight and a different number may be adopted.

A rectangular first diaphragm 2 shapes a beam shape by limiting the light flux width of a passing light flux in the sub-scanning direction. In the present exemplary embodiment, the first diaphragm 2 is arranged near the light source unit 1. Accordingly, an exit pupil position in the sub-scanning direction is arranged on a second image forming lens 6b so that light fluxes from the plurality of light emitting points cross on the second image forming lens 6b in the sub-crossing section to make optical performance of each beam in the sub-scanning direction more likely to match.

A condenser lens (hereinafter, referred to as a "collimator lens" 3 in the present exemplary embodiment) has a rotationally symmetric non-circular (aspherical) surface on the side of a light deflector 10. The collimator lens 3 serves to reduce spot radius differences between light emitting points by refractive power and also to convert a divergent light flux emitted from the light source unit 1 to a parallel light flux.

A lens system (hereinafter, referred to as a "cylindrical lens" 4 as a first optical system) has refractive power only in the sub-scanning section (sub-scanning direction). The cylindrical lens 4 in the present exemplary embodiment causes a light flux that has passed through the collimator lens 3 to form an image on a deflecting surface (reflecting surface) 10a of the light deflector 10 as a linear image in the sub-scanning section.

A second diaphragm 5 further shapes the beam by limiting the light flux width of a passing light flux in the main scanning direction. The second diaphragm 5 in the present exemplary embodiment is arranged between the cylindrical lens 4 and the surface 10a of the light deflector 10a on the side of the light deflector 10 relative to the collimator lens 3. The second diaphragm 5 serves to limit the light flux width in the main scanning direction and also to reduce vertical line fluctuations caused when multiple beams are used by bringing principal rays of light fluxes from the light emitting points on the deflecting surface closer to each other.

The collimator lens 3 and the cylindrical lens 4 may be configured as one optical system. The collimator lens 3 may be configured, instead of being a single lens, as a system of a plurality of lenses. Each of the first diaphragm 2, the collimator lens 3, the cylindrical lens 4, and the second diaphragm 5 constitutes an element of an incident optical system LA that guides a light flux emitted from the light source unit 1 towards the light deflector 10.

In the present exemplary embodiment, an example of the incident optical system LA can be implemented by referring to the numerical example summarized in Table 1. The collimator lens 3 in the main scanning direction is constituted of an aspherical shape represented by a function of up to the 14-th order. In the numerical example, when the intersection of the collimator lens 3 and the optical axis of the incident optical system is set as an origin; the optical axis direction is defined as the X axis; the direction orthogonal to the optical axis in the main scanning section is set as a Y direction, and the direction orthogonal to the optical axis in the sub-scanning section as a Z direction; the collimator lens 3 can be represented by the following function:

$$x = \frac{h^2/R}{1 + \sqrt{1-(h/R)^2}} + Ah^2 + Bh^4 + Ch^6 + Dh^8 + Eh^{10} + Fh^{12} + Gh^{14}$$

$$h = \sqrt{Y^2 + Z^2}$$

where R is a paraxial curvature radius and A, B, C, D, E, F, and G are aspherical coefficients.

TABLE 1

|  | r | d | N (670 nm) |
|---|---|---|---|
| Light source (light emitting point) | 0.0000 | 18.7970 | 0.0000 |
| Sub-scanning diaphragm |  | 4.0000 |  |
| Collimator lens | 100.0000 | 3.9800 | 1.5796 |
|  | −16.621* | 75.4800 | 0.0000 |

TABLE 1-continued

|  | r | d | N (670 nm) |
|---|---|---|---|
| Cylindrical lens | 0.0000 | 3.0000 | 1.5273 |
|  | 0.0000 | 33.0000 | 1.0000 |
| Main scanning diaphragm |  | 22.5000 |  |
| Deflecting surface | 0.0000 | 0.0000 | 1.0000 |

*Aspherical surface

| Aspherical coefficient |  |
|---|---|
| A | 0.00E+00 |
| B | 2.30E−05 |
| C | 5.84E−08 |
| D | 0.00E+00 |
| E | 0.00E+00 |
| F | 0.00E+00 |
| G | 0.00E+00 |

In the present exemplary embodiment, the semiconductor laser as the light source unit 1 is constituted of an 8-beam laser. The pitch between light emitting points is 50 µm; and the light emitting points are inclined by an angle $\alpha=9.2$ degrees with respect to the main scanning direction. By placing an array of light emitting points substantially aligned along the main scanning direction, the optical magnification in the sub-scanning direction can be increased. Accordingly, a semiconductor laser with a wider interval (pitch) between light emitting points can be used. In this manner, heat generated by the light emitting points (e.g., laser elements) can be easily dissipated. Moreover, overlapping of beams can be avoided. Thus, a higher definition optical scanning apparatus can be provided.

The light deflector 10 as a deflecting unit is composed of a polygon mirror with five reflecting surfaces whose circumscribed circle radius is 34 mm and rotates in an arrow A direction in FIG. 1 at substantially constant speed by a drive unit (not illustrated) such as a motor. A polygon mirror is used in the present exemplary embodiment, but a galvanometer mirror that deflects a light flux by sinusoidal vibration can also be used.

An image forming optical system (fθ lens system) 6 as a second optical system having a light-gathering function and fθ characteristics includes first and second image forming lenses (fθ lenses) 6a and 6b, respectively, as optical elements. The first and second image forming lenses (fθ lenses) 6a and 6b are both formed of anamorphic optical elements in an aspherical shape in the main scanning section.

In the present exemplary embodiment, a diffracting surface (optical surface) composed of a diffraction grating formed of a linear sectional shape of the diffracting surface is formed on an exit surface 6b1 of the second image forming lens 6b among a plurality of image forming lenses constituting the image forming optical system 6. Other surfaces include surfaces (refracting surfaces) having only refractive power.

The image forming optical system 6 causes a light flux based on image information reflected/deflected by the light deflector 10 to form an image on a photosensitive drum surface 7 as a surface to be scanned. The image forming optical system 6 makes the diffracting surface 10a of the light deflector 10 and the photosensitive drum surface 7 conjugate with each other in the sub-scanning section, so that a surface tilt error correction can be performed.

In the present exemplary embodiment, a plurality (eight in the present exemplary embodiment) of light fluxes optically modulated by the light source unit 1 according to image information and emitted therefrom is limited in light flux width in the sub-scanning direction by the first diaphragm 2 and converted into a parallel light flux by the collimator lens 3 before entering the cylindrical lens 4. The light flux that has entered the cylindrical lens 4 in the main scanning section exits as it is and is then limited in light flux width in the main scanning direction by the second diaphragm 5. The light flux in the sub-scanning section is converged and passes through the second diaphragm 5 (the light flux width in the main scanning direction is limited) before being formed as a linear image (longer linear image in the main scanning direction) on the deflecting surface 10a of the light deflector 10. Then, a plurality of light fluxes reflected/deflected by the deflecting surface 10a of the light deflector 10 enters the first image forming lens 6a having positive (convex) power mainly in the main scanning direction. Then, the light fluxes are reflected by folding mirrors (surface mirrors) 8a and 8b (FIG. 2) and enter the second image forming lens 6b having positive (convex) power mainly in the sub-scanning direction. Then, the light fluxes that have passed through the second image forming lens 6b are reflected by a folding mirror 8c towards the photosensitive drum to form spots on the photosensitive drum surface 7. The photosensitive drum surface 7 is optically scanned at substantially constant speed in an arrow B direction (main scanning direction B) by rotating the light deflector 10 in the arrow A direction. Accordingly, a plurality of scanning lines is formed simultaneously on the photosensitive drum surface 7 serving as a recording medium to record a latent image.

<Machining Method>

Figure 4A:
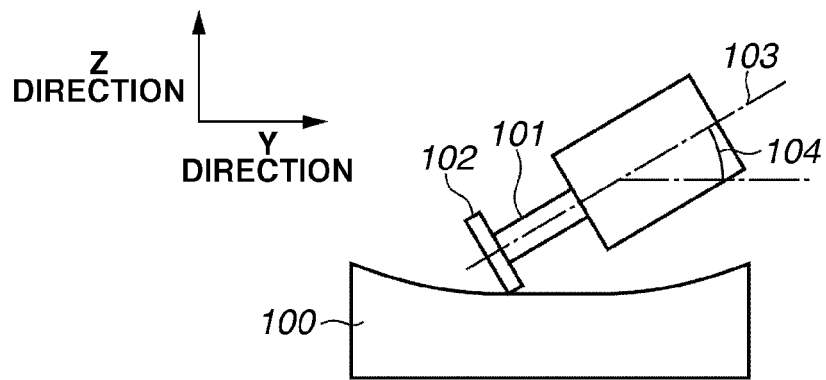
FIGS. 4A to 4D are schematic diagrams illustrating a machining method of a forming die according to the first exemplary embodiment.

Next, a method for machining a diffraction grating formed on a surface of an optical element according to the present exemplary embodiment will be described with reference to FIGS. 4A to 4D. FIGS. 4A to 4D are each diagrams illustrating exemplary steps of the machining method for forming a diffraction grating according to the first exemplary embodiment. In FIG. 4A, a forming die (mirror surface die) 100 is machined to form a diffraction grating on an optical surface (diffracting surface) thereof. A spindle (machine tool) 101 is configured to rotate a cutting tool (cutting edge chip) 102 around a rotation axis 103 and also to change the Y and Z directions by varying an angle 104 to change the position, height, and angle of the cutting tool 102.

Figure 4B:
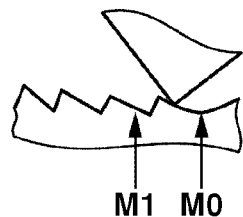

As illustrated in FIG. 4A, the cutting edge chip 102 is provided on an outer circumferential surface of the spindle 101 for fly cutting the forming die 100 to a predetermined shape. Then, as illustrated in FIG. 4B, a rotationally symmetric diffraction grating is machined by first forming a curved surface shape (M0) by a tip portion of the cutting edge chip 102.

Figure 4C:
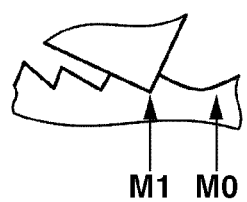
Figure 4D:
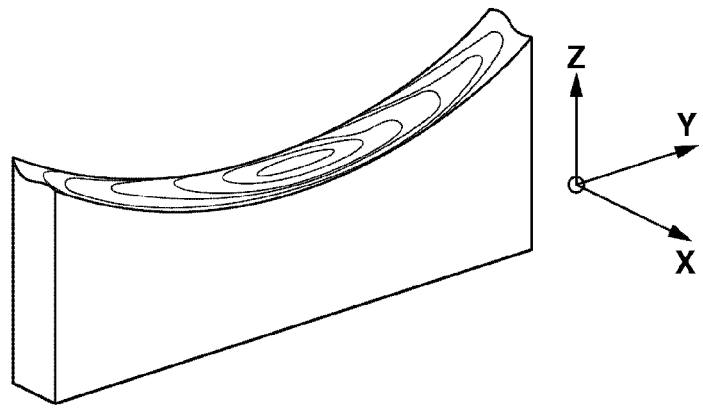

Subsequently, elliptical ridges are cut around M0 to form a diffraction grating having anamorphic diffraction power with an annular zone in an elliptical shape, as illustrated in FIG. 4C. Specifically, annular zones after the first annular zone (M1) are cut one at a time on the diffracting surface of the grating portion. By machining in this manner, several hundred to several thousand annular zones are cut off in a short time to produce a lens-forming die (mold), as illustrated in FIG. 4D. Finally, an image forming lens (diffractive optical element) is formed by injection molding by using the forming die 100 after all of the gratings have been machined. The method of machining the image forming lens is not limited to injection molding. As long as the image forming lens includes a diffraction surface composed of a diffraction grating, any other machining method can be used to form the image forming lens.

Figure 11A:
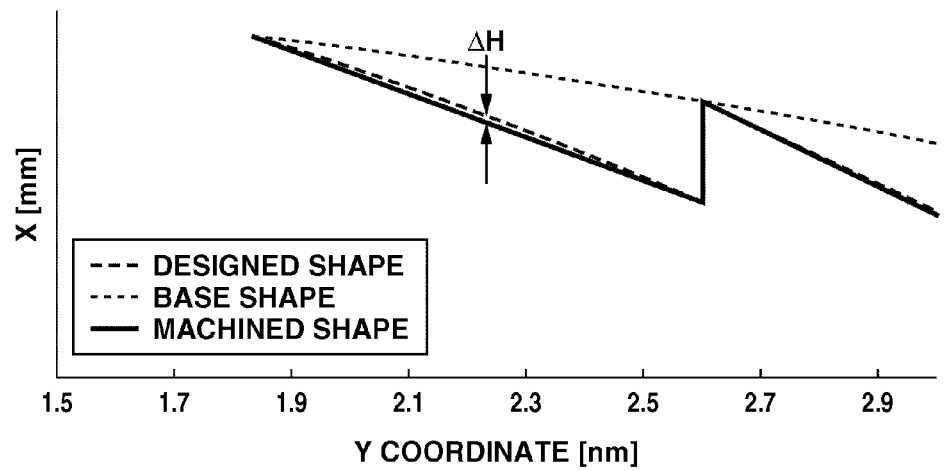
FIGS. 11A and 11B are graphs illustrating the machining error of the diffraction grating slope according to the first exemplary embodiment.
Figure 11B:
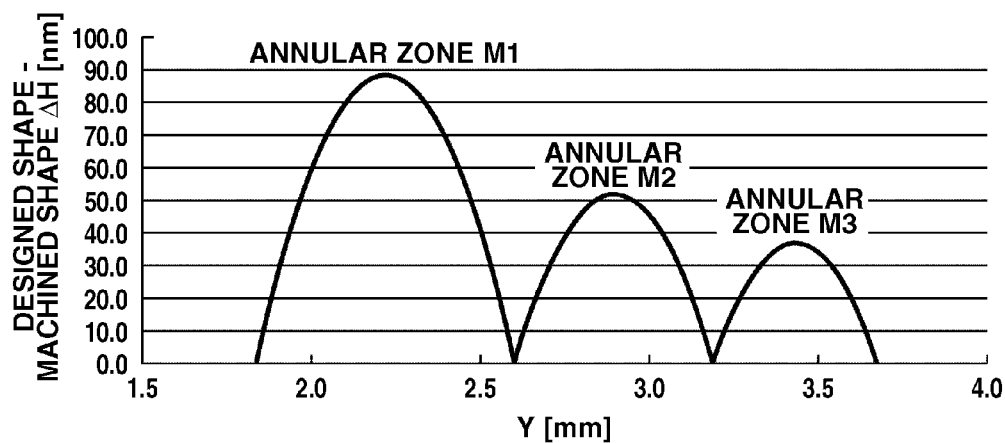

Next, a machining error of the diffracting surface (slope) of a diffraction grating will be described with reference to FIGS. 11A and 11B. FIG. 11A is a diagram illustrating a machining error of the slope of a diffraction grating. A machining error of the slope of a diffraction grating (diffracting surface) is a difference $\Delta H$ between a phase function (design shape) represented by a designed curve and a linear shape (machined shape) machined by a cutting tool. FIG. 11B is a diagram illustrating the machining error $\Delta H$ in each portion of the slope of the diffraction grating in the longer direction (Y direction) of the forming die 100 (see FIG. 4D). The machining error is maximal ($\Delta H_{max}$) near the center of one grating portion and minimal at both ends of the grating portion. A machining error in annular zones after M2 is smaller than the machining error $\Delta H_{max}$ of the annular zone M1. Hereinafter, $\Delta H_{max}$ will be called a machining error.

In the image forming optical system 6 in the present exemplary embodiment, the intersection of a surface of an image forming lens and the optical axis of the optical system 6 is set as the origin. In addition, as illustrated in FIG. 1, the optical axis is set as the X axis, the direction orthogonal to the optical axis in the main scanning section B is set as the Y axis, and the direction orthogonal to the optical axis in the sub-scanning section is set as the Z axis on the scanning start side and the scanning end side with respect to the optical axis. Then, the shape of each surface can be represented by the following functions:

(Main Scanning Direction)
Scanning Start Side $$x = \frac{y^2/R}{1+\sqrt{1-(1+K)(y/R)^2}} + B_{4s}y^4 + B_{6s}y^6 + B_{8s}y^8 + B_{10s}y^{10} \tag{a}$$

Scanning End Side $$x = \frac{y^2/R}{1+\sqrt{1-(1+K)(y/R)^2}} + B_{4e}y^4 + B_{6e}y^6 + B_{8e}y^8 + B_{10e}y^{10} \tag{b}$$

where R is a curvature radius and K, $B_4$, $B_6$, $B_8$, and $B_{10}$ are aspherical coefficients.

The phase function $\phi(y, z)$ is given by $$\Phi(y,z) = \frac{2\pi}{m\lambda}\{(E_1 y + E_2 y^2 + E_3 y^3 + \ldots + E_{10} y^{10}) + z^2(F_0 + F_1 y + F_2 y^2 + F_3 y^3 + \ldots + F_{10} y^{10})\}$$

where m is the diffraction order, and $E_1$ to $E_{10}$ and $F_0$ to $F_{10}$ are phase coefficients. $E_1$ to $E_{10}$ are terms representing power in the main scanning direction. $F_0$ to $F_{10}$ are terms representing power in the sub-scanning direction. Setting y=0 and z=0 corresponds to being on the optical axis.

In the present exemplary embodiment, the shape of the entrance surface of the first image forming lens 6a in the main scanning direction is formed symmetrically with respect to the optical axis and the shape of the exit surface is changed asymmetrically with respect to the optical axis. The shape of the entrance surface of the second image forming lens 6b in the main scanning direction is non-circular, represented by a non-circular function of 10-th order, and an exit surface 6b1 is formed of a surface having refractive power and diffraction power represented by a phase function.

As shown in Table 2 described below, diffraction power is continuously changed from on-axis to off-axis. This is because diffraction power in the main scanning direction B is configured to reduce chromatic aberration of magnification (printing position shift in the main scanning direction due to wave motion fluctuations) arising in a scanning optical unit. Normally, chromatic aberration of magnification is small on an axis with a small scanning angle (axial vicinity) and increases with an increasing scanning angle, that is, it increases from on-axis toward off-axis. Therefore, it is necessary to also change diffraction power continuously from on-axis to off-axis. Moreover, with the configuration of the present embodiment, settings are made so that refractive power and diffraction power received by a light flux converged on the axial vicinity cancel out to bring the slope shape (diffracting surface shape) of the grating surface of a diffraction grating on the axis close to a plane.

That is, if diffraction power and refractive power received by a light flux converged on the optical axis are φDO and φref on the diffracting surface, respectively, settings are made in the present exemplary embodiment so that the diffraction power φDO and the refractive power φref have opposite signs.

If the design wavelength is λ0, the wavelength used is λ, the diffraction order is m, and the refractive index is N, the diffraction power φDO ($\phi_{DOf}$) and the refractive power φref in the main scanning direction B, according to the present exemplary embodiment, can be calculated by the following formulas:

$$\phi_{ref} = \frac{1-N}{r}$$

$$\phi_{DOf} = -2mE_2\frac{\lambda}{\lambda_0}$$

In the present exemplary embodiment, settings are made to make the diffraction power φDO on the optical axis relatively weak so that the diffraction power φDO satisfies a conditional equation (1) below:

$$0 < \phi DO < 1.8 \times 10^{-3} (1/mm) \quad (1)$$

The conditional equation (1) is used to specify the value of the diffraction power φDO. Deviating from the conditional equation (1) is not good because the diffraction power φDO becomes too strong, a chromatic aberration of magnification is caused, and focusing fluctuations occur due to lot-to-lot variations in laser wavelength. The conditional equation (1) is more desirably set as follows:

$$0 < \phi DO < 5 \times 10^{-4} (1/mm) \quad (1a)$$

Also in the present exemplary embodiment, the diffracting surface and the refracting surface are formed centered on the optical axis in such a way that the following condition is satisfied:

$$0.5|\phi DO| < |\phi ref| < 1.5|\phi DO| \quad (2)$$

The conditional equation (2) is used to specify the refractive power φref and the diffraction power φDO. Deviating from the conditional equation (2) is not good because the slope shape of the grating surface of a designed ideal diffraction grating begins to depart from a plane, leading to a greater phase error of wavefront and degraded spots. The conditional equation (2) is more desirably set as follows:

$$0.6|\phi DO| < |\phi ref| < 1.3|\phi DO| \quad (2a)$$

In the present exemplary embodiment, φDO and φref are set as follows to make the diffraction power φDO positive (convex) and the refractive power φref negative (concave):

$$\phi DO = 3.98 \times 10^{-4} (1/mm)$$

$$\phi ref = -2.5 \times 10^{-4} (1/mm)$$

Accordingly, in the present exemplary embodiment, focusing fluctuations and spot degradation caused by variations in laser wavelength are simultaneously reduced.

Also in the present exemplary embodiment as shown in Table 2 described below, the diffraction power φDO is set to be mutually different in a meridional direction (main scanning direction) and a sagittal direction (sub-scanning direction).

Figure 5:
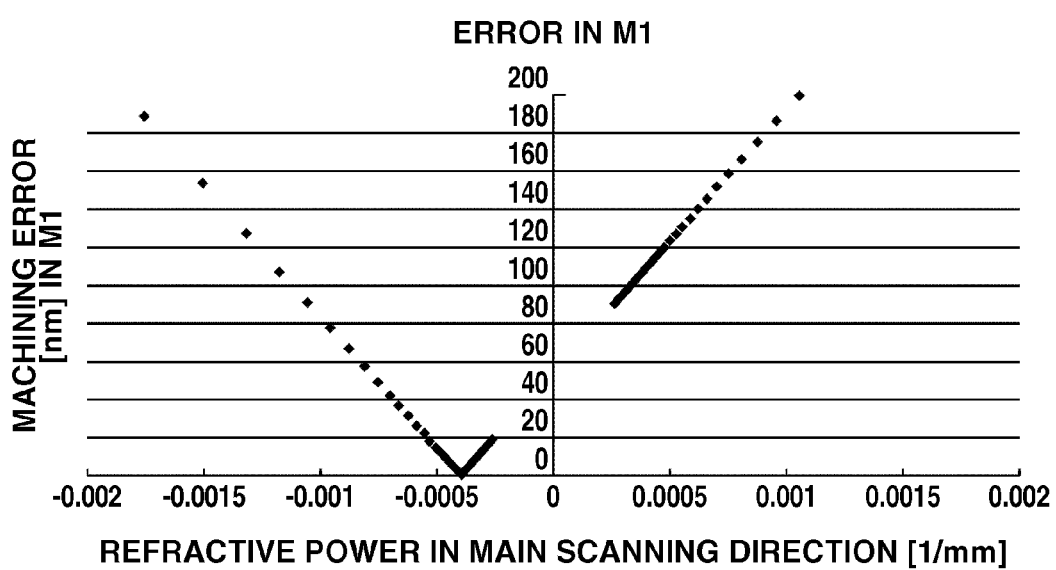
FIG. 5 is a graph illustrating refractive power and a machining error in an annular zone M1 of an optical element according to the first exemplary embodiment.

FIG. 5 illustrates a relationship between the refractive power φref and the machining error in the annular zone M1 when the diffraction power is φDO=3.98×10⁻⁴. The machining error in the present exemplary embodiment is obtained as 19.9 nm by setting φref=−2.5×10⁻⁴. The refractive power φref at which the machining error becomes zero is 2×E₂=2×(−1.99E−4)=3.98×10⁻⁴. When the refractive power is φref=0, the machining error becomes 54.3 nm.

The machining error in the present exemplary embodiment is 0.1λ (67 nm) or less, which reduces spot degradation. If the machining error is more desirably set to 0.05λ (33.5 nm) or less, spot degradation can be further reduced. Further in the present exemplary embodiment, an influence of grating deprivation due to expansion when an optical element is formed by providing a diffracting surface on the exit surface 6b1 of the second image forming lens 6b can be reduced.

Only the diffraction grating on the axis (near the axis) is focused on in the present exemplary embodiment, but no issue is caused because the designed grating pitch of an off-axis diffraction grating is narrower than that of an on-axis diffraction grating. Accordingly, an influence of off-axis wavefront aberrations becomes ignorably small by reducing on-axis wavefront aberrations where the grating pitch is wider.

For convenience, the image forming optical system of the present exemplary embodiment has been illustrated as including two image forming lenses, but the present invention is not limited to this. An effect similar to that of the above exemplary embodiment can be achieved by configuring the image forming optical system with only one or more than two image forming lenses.

The shape of the image forming lens 6 in the sub-scanning direction according to the present exemplary embodiment has a continuously changing curvature in the sub-scanning section (surface containing the optical axis and perpendicular to the main scanning section) of the second image forming lens 6b on the scanning start side and the scanning end side with respect to the optical axis within an effective range of lenses. Further, the shapes in the main scanning direction B and the sub-scanning direction are formed asymmetrically with respect to the optical axis.

If the optical axis is set as the X axis, the direction orthogonal to the optical axis in the main scanning section as the Y axis, and the direction orthogonal to the optical axis in the sub-scanning section as the Z axis on the scanning start side and the scanning end side with respect to the optical axis, the shape of the image forming lens 6 in the sub-scanning direction can be represented by the following continuous functions:

Functions of r1 to r4 Surfaces in the Sub-Scanning Direction $$S = \frac{z^2/r'}{1+\sqrt{1-(z/r')^2}}$$

$$r' = r(1 + D_{2s}y^2 + D_{4s}y^4 + D_{6s}y^4 + D_{8s}y^8 + D_{10s}y^{10})$$

$$S = \frac{z^2/r'}{1+\sqrt{1-(z/r')^2}}$$

$$r' = r(1 + D_{2e}y^2 + D_{4e}y^4 + D_{6e}y^4 + D_{8e}y^8 + D_{10e}y^{10})$$

(r' is the curvature radius in the sub-scanning direction, $D_2$, $D_4$, $D_6$, $D_8$, and $D_{10}$ are coefficients) and the suffix s of each coefficient indicates the scanning start side and the suffix e the scanning end side.

The curvature radius in the sub-scanning direction is a curvature radius in a section perpendicular to a shape (bus) in the main scanning direction.

The phase function φ(y, z) is given by $$\Phi(y,z) = \frac{2\pi}{m\lambda}\{(E_1 y + E_2 y^2 + E_3 y^3 + ... + E_{10} y^{10}) + z^2(F_0 + F_1 y + F_2 y^2 + F_3 y^3 + ... + F_{10} y^{10})\}$$

where m is the diffraction order, and $E_1$ to $E_{10}$ and $F_0$ to $F_{10}$ are phase coefficients. $F_0$ to $F_{10}$ are terms representing power in the sub-scanning direction. $E_1$ to $E_{10}$ are terms representing power in the main scanning direction.

As described above, a feature of optical performance in the sub-scanning direction in the present exemplary embodiment is that light beam shifts (pitch unevenness) on the photosensitive drum caused when a deflecting/refracting surface tilts in the sub-scanning direction for three minutes in an environment in which the temperature rises to 25° C. are reduced. As shown in Table 2 described below, the arrangement of diffraction power and refractive power in the sub-scanning direction is optimized so that even if the temperature rises, the scanning line pitch in the sub-scanning direction is less likely to change, or any changes therein are kept to a minimum. Accordingly, when compared with a configuration including only a refractive optical system, an optical system in which moire is less likely to occur in an image due to environmental variations can be provided.

In the image forming optical system 6 in the present exemplary embodiment, the image forming optical elements (image forming lenses) 6a and 6b are constituted of plastic lenses (refractive index N=1.527275) having light transmitting power. Accordingly, weight reduction of the image forming optical elements can be achieved, and also flexibility of design can be improved by using an aspherical surface. However, the present exemplary embodiment is not limited to this, and by using lenses made of glass, a similar effect of being able to bring the slope of a diffraction grating to a plane can be gained.

In the present exemplary embodiment, as illustrated in FIG. 2, the optical path of a scanning optical system can be compactly folded by using the surface mirrors 8a, 8b, and 8c for folding the optical path, thus making an image forming apparatus compact.

Table 2 shows numeric values of an optical scanning apparatus according to the first exemplary embodiment. "E-x" means "$10^{-x}$", which applies also in subsequent exemplary embodiments. An R1 surface is a surface of the first image forming lens 6a on the side of the light deflector 10, an R2 surface is a surface of the first image forming lens 6a on the side of the drum surface 7 to be scanned, an R3 surface is a surface of the second image forming lens 6b on the side of the light deflector 10, and an R4 surface is a surface of the second image forming lens 6b on the side of the drum surface 7 to be scanned.

TABLE 2

| | |
|---|---|
| Wavelength used (mm) | 6.70E−07 |
| Refractive index of image forming optical system | 1.527275 |
| Number of surfaces of deflecting unit | 5 |
| Circumscribed circle radius of deflecting unit (mm) | 34 |
| Rotation angle of deflecting unit (±deg.) | 24 |
| Incidence angle in main scanning direction (deg.) | 70 |
| Incidence angle in sub-scanning direction (deg.) | 0 |
| Axial deflection point - entrance surface of first image forming lens (mm) | 2.65E+01 |
| Focal length of image forming lens (mm) | 2.00E+02 |

Rotation Center Coordinates of Deflecting Unit

| | |
|---|---|
| X | −12.415 |
| Y | −6.247 |

| | | R1 surface | | R2 surface | |
|---|---|---|---|---|---|
| | | Scanning start side (s) | Scanning end side (e) | Scanning start side (s) | Scanning end side (e) |
| Main scanning section | d | 9.60E+00 | | 6.790E+01 | |
| | R | −8.84E+01 | | −4.67E+01 | |
| | K | 2.56E+00 | 2.56E+00 | 3.31E−01 | 3.31E−01 |
| | B4 | 9.88E−07 | 9.88E−07 | 1.55E−06 | 1.53E−06 |
| | B6 | 4.07E−10 | 4.07E−10 | 5.47E−10 | 6.56E−10 |
| | B8 | −5.30E−13 | −5.30E−13 | 9.26E−14 | −6.52E−14 |
| | B10 | −2.88E−17 | −2.88E−17 | −1.37E−16 | −6.17E−17 |
| Sub-scanning section | r | −1.00E+03 | | −1.00E+03 | |
| | D2 | 0.00E+00 | −0.00E+00 | 0.00E+00 | 0.00E+00 |
| | D4 | 0.00E+00 | 0.00E+00 | 0.00E+00 | 0.00E+00 |
| | D6 | 0.00E+00 | 0.00E+00 | 0.00E+00 | 0.00E+00 |
| | D8 | 0.00E+00 | 0.00E+00 | 0.00E+00 | 0.00E+00 |
| | D10 | 0.00E+00 | 0.00E+00 | 0.00E+00 | 0.00E+00 |

|  | R3 surface | | R4 surface | |
| --- | --- | --- | --- | --- |
|  | Scanning start side (s) | Scanning end side (e) | Scanning start side (s) | Scanning end side (e) |
| Main scanning section | d 5.50E+00 | | d 1.27E+02 | |
| | R −4.14E+02 | | R 2.11E+03 | |
| | K 1.33E+00 | K 1.33E+00 | K −1.18E+03 | K −1.18E+03 |
| | B4 1.92E−07 | B4 1.92E−07 | B4 −2.39E−07 | B4 −2.39E−07 |
| | B6 −2.10E−11 | B6 −2.10E−11 | B6 2.32E−11 | B6 2.32E−11 |
| | B8 7.16E−16 | B8 7.16E−16 | B8 −1.80E−15 | B8 −1.80E−15 |
| | B10 5.17E−20 | B10 5.17E−20 | B10 6.49E−20 | B10 6.49E−20 |
| Sub-scanning section | r 6.63E+01 | | r −1.00E+02 | |
| | D2 1.98E−04 | D2 2.16E−04 | D2 1.57E−04 | D2 2.49E−04 |
| | D4 3.04E−08 | D4 2.18E−08 | D4 −6.65E−08 | D4 −5.72E−08 |
| | D6 −3.94E−11 | D6 −4.06E−11 | D6 7.12E−12 | D6 −4.86E−12 |
| | D8 1.28E−14 | D8 1.26E−14 | D8 6.79E−17 | D8 1.29E−15 |
| | D10 −1.10E−18 | D10 −1.09E−18 | D10 −3.62E−20 | D10 −2.31E−20 |

| Phase coefficient | | | |
| --- | --- | --- | --- |
| Main scanning direction | | Sub-scanning direction | |
|  |  | F0 | −2.26E−03 |
| E1 | 0.00E+00 | F1 | 0.00E+00 |
| E2 | −1.99E−04 | F2 | −8.99E−07 |
| E3 | 0.00E+00 | F3 | 3.72E−09 |
| E4 | 5.80E−08 | F4 | 4.14E−10 |
| E5 | 0.00E+00 | F5 | −1.54E−12 |
| E6 | −8.12E−12 | F6 | −7.22E−14 |
| E7 | 0.00E+00 | F7 | 1.34E−16 |
| E8 | 2.11E−16 | F8 | 4.51E−18 |
| E9 | 0.00E+00 | F9 | 0.00E+00 |
| E0 | 1.73E−20 | F10 | 0.00E+00 |

Figure 6:
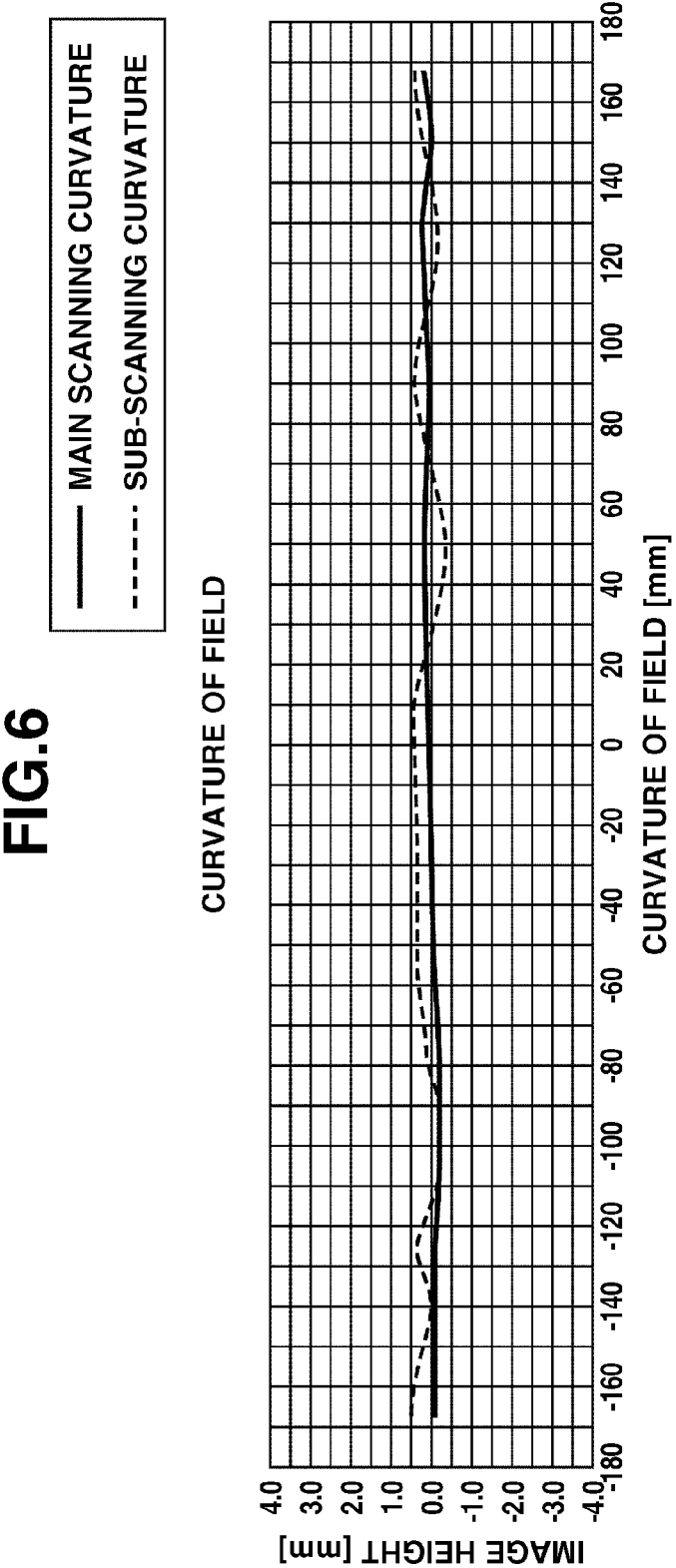
FIG. 6 is a graph illustrating optical performance of an optical element according to the first exemplary embodiment.

FIG. 6 illustrates curvature of field on a surface to be scanned in the present exemplary embodiment. As is evident from FIG. 6, curvature of field is reduced by an aspherical effect of refraction and diffraction.

Figure 7:
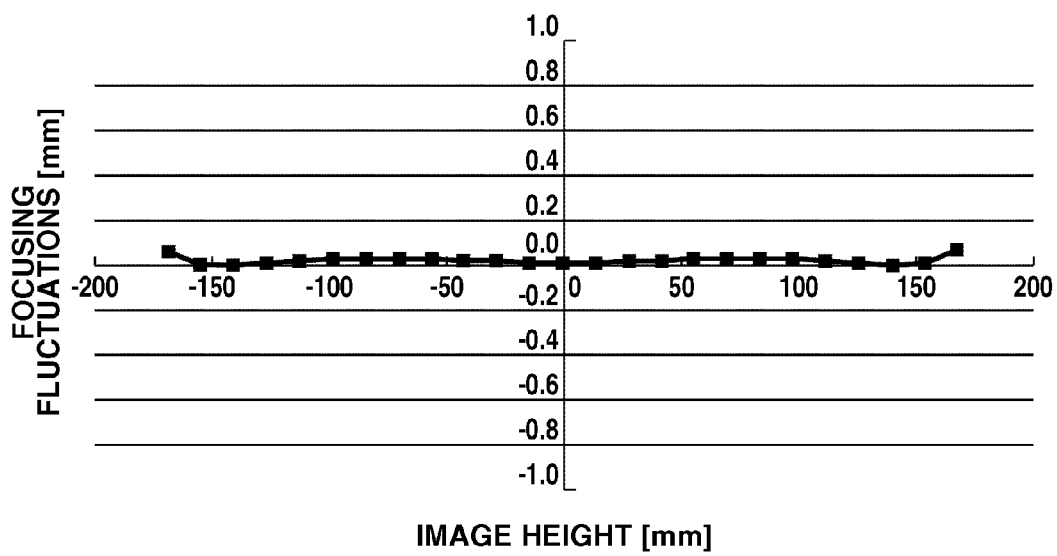
FIG. 7 is a graph illustrating focusing fluctuations in a main scanning direction of the optical element according to the first exemplary embodiment.

FIG. 7 illustrates focusing fluctuations (axial chromatic aberration) in the main scanning direction when the wavelength difference is Δλ=1.5 nm in the present exemplary embodiment. Diffraction power is made relatively weaker in the present exemplary embodiment and thus, axial chromatic aberration is limited to 0.1 mm or less. Since the focusing relative difference between light emitting points of the laser light source in the present exemplary embodiment is limited to 1.5 nm or less, a focusing difference between light sources due to axial chromatic aberration hardly arises.

Figure 8:
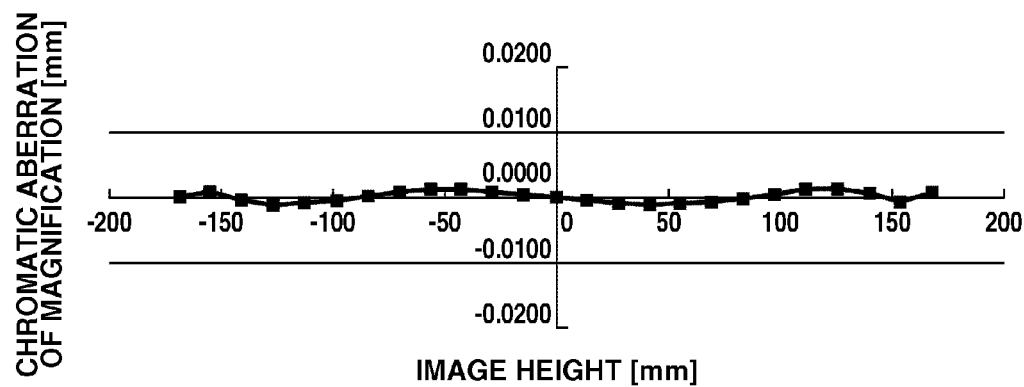
FIG. 8 is a graph illustrating chromatic aberration of magnification when the temperature inside an optical scanning apparatus in which an image forming lens is mounted is 25° C. according to the first exemplary embodiment.

FIG. 8 illustrates chromatic aberration of magnification when the wavelength difference is Δλ=1.5 nm in an environment in which the temperature inside an optical scanning apparatus in which an image forming lens is mounted is to 25° C. (degrees Celsius) in the present exemplary embodiment. By using the above diffraction power, chromatic aberration of magnification is limited to ¼ or less of that when configured only by a refractive optical system. Accordingly, color shifts of a color image forming apparatus in the main scanning direction are effectively minimized.

Figure 9:
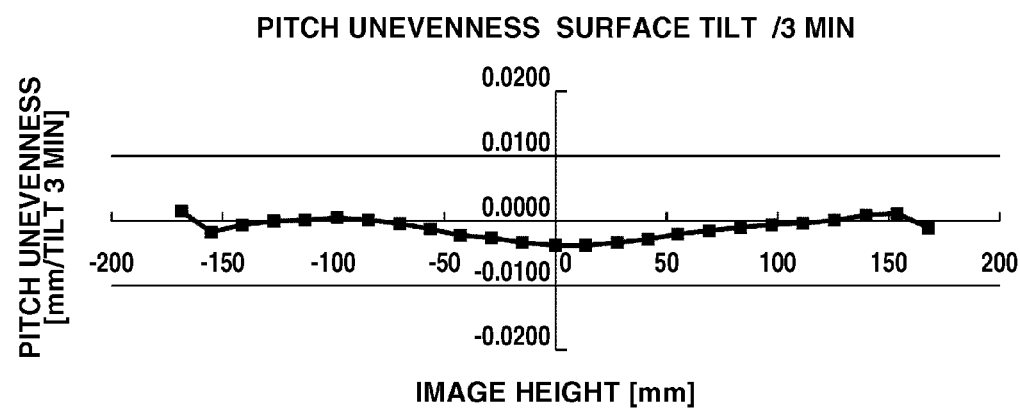
FIG. 9 is a graph illustrating a pitch unevenness deterioration quantity when the temperature inside an optical scanning apparatus in which an image forming lens is mounted is 25° C. according to the first exemplary embodiment.

FIG. 9 illustrates light beam shifts (pitch unevenness) on the drum surface 7 caused when a deflecting/refracting surface tilts in the sub-scanning direction for three minutes in an environment in which the temperature inside an optical scanning apparatus in which an image forming lens is mounted is 25° C. By using the above diffraction power, the light beam shift is limited to ½ or less of that when configured only by a refractive optical system. Thus, an occurrence of moire in an image due to environmental variations is suppressed.

In the present exemplary embodiment, as described above, a diffraction surface is formed on at least one surface (exit surface) of the second image forming lens 6b, and the refractive power $\phi ref$ and the diffraction power $\phi DO$ are optimized so that, even if the sectional shape of a grating slope is linearly machined, a high-definition optical scanning apparatus with minimal spot degradation can be provided.

Second Embodiment

Next, a second exemplary embodiment of the present invention will be described. Sectional views of an optical scanning apparatus in the present exemplary embodiment in the main scanning direction and the sub-scanning direction are the same as those in the first exemplary embodiment illustrated in FIGS. 1 and 2.

The present exemplary embodiment is different from the above first exemplary embodiment in that the refractive power $\phi ref$ in the main scanning direction on the exit surface 6b1 of the second image forming lens 6b forming a diffraction grating is changed. No other change is made in the configuration, and optical operations are similar to those in the first exemplary embodiment and a similar effect is thereby gained.

In the present exemplary embodiment, the diffraction power $\phi DO$ and the refractive power $\phi ref$ on a surface where a diffracting surface is formed are set as shown below to satisfy the conditional equations (1) and (2). Accordingly, focusing fluctuations and spot degradation caused by variations in laser wavelength are simultaneously reduced.

$$\phi DO = 3.98 \times 10^{-4} (1/mm)$$

$$\phi ref = -5.0 \times 10^{-4} (1/mm)$$

In the present exemplary embodiment, the negative (concave) refractive power $\phi ref$ is made stronger than in the first exemplary embodiment and the distance from the deflecting surface to the surface to be scanned of the light deflector is shortened to make the optical scanning apparatus compact. Moreover, the machining error in the annular zone M1 is set to 14.9 nm, which makes the wave front aberration lower than in the first exemplary embodiment to suppress spot degradation.

Thus, in the present exemplary embodiment, the refractive power $\phi ref$ in the main scanning direction is made stronger so that a compact optical scanning apparatus in which the distance from the deflecting surface to the surface to be scanned is short can be provided. Table 3 shows numeric values of an optical scanning apparatus according to the second exemplary embodiment.

TABLE 3

| | |
|---|---|
| Wavelength used (mm) | 6.70E−07 |
| Wavelength used (mm) | 1.527275 |
| Number of surfaces of deflecting unit | 5 |
| Circumscribed circle radius of deflecting unit (mm) | 34 |
| Rotation angle of deflecting unit (±deg.) | 24 |
| Incidence angle in main scanning direction (deg.) | 70 |
| Incidence angle in sub-scanning direction (deg.) | 0 |
| Axial deflection point - entrance surface of first image forming lens (mm) | 2.65E+01 |
| Focal length of image forming lens (mm) | 2.00E+02 |

Rotation Center Coordinates of Deflecting Unit

| | |
|---|---|
| X | −12.415 |
| Y | −6.247 |

| | Phase coefficient | | |
|---|---|---|---|
| | Main scanning direction | | Sub-scanning direction |
| | | F0 | −2.26E−03 |
| E1 | 0.00E+00 | F1 | 0.00E+00 |
| E2 | −1.99E−04 | F2 | −8.99E−07 |
| E3 | 0.00E+00 | F3 | 3.72E−09 |
| E4 | 5.80E−08 | F4 | 4.14E−10 |
| E5 | 0.00E+00 | F5 | −1.54E−12 |
| E6 | −8.12E−12 | F6 | −7.22E−14 |
| E7 | 0.00E+00 | F7 | 1.34E−16 |
| E8 | 2.11E−16 | F8 | 4.51E−18 |
| E9 | 0.00E+00 | F9 | 0.00E+00 |
| E0 | 1.73E−20 | F10 | 0.00E+00 |

Third Embodiment

Next, a third exemplary embodiment of the present invention will be described. The main scanning sectional view and the sub-scanning sectional view of an optical scanning apparatus in the present exemplary embodiment are the same as those in the first exemplary embodiment illustrated in FIGS. 1 and 2.

| | | R1 surface | | | R2 surface | |
|---|---|---|---|---|---|---|
| | | Scanning start side (s) | Scanning end side (e) | | Scanning start side (s) | Scanning end side (e) |
| Main scanning section | d | 9.60E+00 | | d | 6.790E+01 | |
| | R | −8.84E+01 | | R | −4.67E+01 | |
| | K | 2.56E+00  K | 2.56E+00 | K | 3.31E−01  K | 3.31E−01 |
| | B4 | 9.88E−07  B4 | 9.88E−07 | B4 | 1.55E−06  B4 | 1.53E−06 |
| | B6 | 4.07E−10  B6 | 4.07E−10 | B6 | 5.47E−10  B6 | 6.56E−10 |
| | B8 | −5.30E−13  B8 | −5.30E−13 | B8 | 9.26E−14  B8 | −6.52E−14 |
| | B10 | −2.88E−17  B10 | −2.88E−17 | B10 | −1.37E−16  B10 | −6.17E−17 |
| Sub-scanning section | r | −1.00E+03 | | r | −1.00E+03 | |
| | D2 | 0.00E+00  D2 | 0.00E+00 | D2 | 0.00E+00  D2 | 0.00E+00 |
| | D4 | 0.00E+00  D4 | 0.00E+00 | D4 | 0.00E+00  D4 | 0.00E+00 |
| | D6 | 0.00E+00  D6 | 0.00E+00 | D6 | 0.00E+00  D6 | 0.00E+00 |
| | D8 | 0.00E+00  D8 | 0.00E+00 | D8 | 0.00E+00  D8 | 0.00E+00 |
| | D10 | 0.00E+00  D10 | 0.00E+00 | D10 | 0.00E+00  D10 | 0.00E+00 |

| | | R3 surface | | | R4 surface | |
|---|---|---|---|---|---|---|
| | | Scanning start side (s) | Scanning end side (e) | | Scanning start side (s) | Scanning end side (e) |
| Main scanning section | d | 5.50E+00 | | d | 1.26E+02 | |
| | R | −5.00E+02 | | R | 1.05E+03 | |
| | K | 1.32E+01  K | 1.32E+01 | K | −1.17E+03  K | −1.17E+03 |
| | B4 | 1.15E−07  B4 | 1.15E−07 | B4 | −2.47E−07  B4 | −2.47E−07 |
| | B6 | −2.03E−11  B6 | −2.03E−11 | B6 | 1.65E−11  B6 | 1.65E−11 |
| | B8 | 6.38E−16  B8 | 6.38E−16 | B8 | −1.35E−15  B8 | −1.35E−15 |
| | B10 | 4.56E−20  B10 | 4.56E−20 | B10 | 4.89E−20  B10 | 4.89E−20 |
| Sub-scanning section | r | 6.62E+01 | | r | −1.00E+02 | |
| | D2 | 2.12E−04  D2 | 2.20E−04 | D2 | 1.53E−04  D2 | 2.52E−04 |
| | D4 | 2.17E−08  D4 | 1.88E−08 | D4 | −6.66E−08  D4 | −5.77E−08 |
| | D6 | −3.79E−11  D6 | −4.03E−11 | D6 | 7.12E−12  D6 | −4.89E−12 |
| | D8 | 1.29E−14  D8 | 1.26E−14 | D8 | 6.18E−17  D8 | 1.24E−15 |
| | D10 | −1.10E−18  D10 | −1.11E−18 | D10 | −3.70E−20  D10 | −1.31E−20 |

The present exemplary embodiment is different from the above first exemplary embodiment in that the refractive power φref in the main scanning direction on the exit surface 6b1 of the second image forming lens 6b forming a diffraction grating is changed. No other change is made in the configuration, and optical operations are similar to those in the first exemplary embodiment and a similar effect is thereby gained.

In the present exemplary embodiment, the diffraction power φDO and the refractive power φref on a surface where a diffracting surface is formed are set as shown below to satisfy the conditional equations (1) and (2). Accordingly, focusing fluctuations and spot degradation caused by variations in laser wavelength are simultaneously reduced.

$$\phi DO = 3.98 \times 10^{-4} (1/mm)$$

$$\phi ref = -3.98 \times 10^{-4} (1/mm)$$

Moreover, the machining error in the annular zone M1 is set to 0 nm, which makes the machining error in the annular zone M1 smaller than in the first exemplary embodiment to further reduce spot degradation caused by wave front aberrations.

In the present exemplary embodiment, as described above, no designed machining error occurs even if the slope of a diffraction grating is linearly machined so that an optical scanning apparatus in which spot degradation is less likely to occur can be provided. Table 4 shows numeric values of an optical scanning apparatus according to the third exemplary embodiment.

TABLE 4

| | |
|---|---|
| Wavelength used (mm) | 6.70E−07 |
| Refractive index of image forming optical system | 1.527275 |
| Number of surfaces of deflecting unit | 5 |
| Circumscribed circle radius of deflecting unit (mm) | 34 |
| Rotation angle of deflecting unit (±deg.) | 24 |
| Incidence angle in main scanning direction (deg.) | 70 |
| Incidence angle in sub-scanning direction (deg.) | 0 |
| Axial deflection point - entrance surface of first image forming lens (mm) | 2.65E+01 |
| Focal length of image forming lens (mm) | 2.00E+02 |

Rotation Center Coordinates of Deflecting Unit

| | |
|---|---|
| X | −12.415 |
| Y | −6.247 |

| | | R1 surface | | | R2 surface | |
|---|---|---|---|---|---|---|
| | | Scanning start side (s) | Scanning end side (e) | | Scanning start side (s) | Scanning end side (e) |
| Main scanning section | d | | 9.60E+00 | d | | 6.790E+01 |
| | R | −8.84E+01 | | R | −4.67E+01 | |
| | K | 2.56E+00 | K 2.56E+00 | K | 3.31E−01 | K 3.31E−01 |
| | B4 | 9.88E−07 | B4 9.88E−07 | B4 | 1.55E−06 | B4 1.53E−06 |
| | B6 | 4.07E−10 | B6 4.07E−10 | B6 | 5.47E−10 | B6 6.56E−10 |
| | B8 | −5.30E−13 | B8 −5.30E−13 | B8 | 9.26E−14 | B8 −6.52E−14 |
| | B10 | −2.88E−17 | B10 −2.88E−17 | B10 | −1.37E−16 | B10 −6.17E−17 |
| Sub-scanning section | r | −1.00E+03 | | r | −1.00E+03 | |
| | D2 | 0.00E+00 | D2 0.00E+00 | D2 | 0.00E+00 | D2 0.00E+00 |
| | D4 | 0.00E+00 | D4 0.00E+00 | D4 | 0.00E+00 | D4 0.00E+00 |
| | D6 | 0.00E+00 | D6 0.00E+00 | D6 | 0.00E+00 | D6 0.00E+00 |
| | D8 | 0.00E+00 | D8 0.00E+00 | D8 | 0.00E+00 | D8 0.00E+00 |
| | D10 | 0.00E+00 | D10 0.00E+00 | D10 | 0.00E+00 | D10 0.00E+00 |

| | | R3 surface | | | R4 surface | |
|---|---|---|---|---|---|---|
| | | Scanning start side (s) | Scanning end side (e) | | Scanning start side (s) | Scanning end side (e) |
| Main scanning section | d | | 5.50E+00 | d | | 1.26E+02 |
| | R | −4.67E+02 | | R | 1.33E+03 | |
| | K | 1.04E+01 | K 1.04E+01 | K | −1.32E+03 | K −1.32E+03 |
| | B4 | 1.22E−07 | B4 1.22E−07 | B4 | −2.56E−07 | B4 −2.56E−07 |
| | B6 | −1.94E−11 | B6 −1.94E−11 | B6 | 1.87E−11 | B6 1.87E−11 |
| | B8 | 5.92E−16 | B8 5.92E−16 | B8 | −1.34E−15 | B8 −1.34E−15 |
| | B10 | 3.51E−20 | B10 3.51E−20 | B10 | 3.08E−20 | B10 3.08E−20 |
| Sub-scanning section | r | 6.62E+01 | | r | −1.00E+02 | |
| | D2 | 2.11E−04 | D2 2.16E−04 | D2 | 1.53E−04 | D2 2.55E−04 |
| | D4 | 2.17E−08 | D4 1.82E−08 | D4 | −6.66E−08 | D4 −5.64E−08 |
| | D6 | −3.79E−11 | D6 −4.04E−11 | D6 | 7.12E−12 | D6 −5.24E−12 |
| | D8 | 1.29E−14 | D8 1.26E−14 | D8 | 6.12E−17 | D8 1.24E−15 |
| | D10 | −1.11E−18 | D10 −1.10E−18 | D10 | −3.72E−20 | D10 −1.17E−20 |

| Phase coefficient | | | |
|---|---|---|---|
| Main scanning direction | | Sub-scanning direction | |
| | | F0 | -2.26E-03 |
| E1 | 0.00E+00 | F1 | 0.00E+00 |
| E2 | -1.99E-04 | F2 | -8.99E-07 |
| E3 | 0.00E+00 | F3 | 3.72E-09 |
| E4 | 5.80E-08 | F4 | 4.14E-10 |
| E5 | 0.00E+00 | F5 | -1.54E-12 |
| E6 | -8.12E-12 | F6 | -7.22E-14 |
| E7 | 0.00E+00 | F7 | 1.34E-16 |
| E8 | 2.11E-16 | F8 | 4.51E-18 |
| E9 | 0.00E+00 | F9 | 0.00E+00 |
| E0 | 1.73E-20 | F10 | 0.00E+00 |

Fourth Embodiment

Next, a fourth exemplary embodiment of the present invention will be described. Sectional views of an optical scanning apparatus in the present exemplary embodiment in the main scanning direction and the sub-scanning direction are the same as those in the first exemplary embodiment illustrated in FIGS. 1 and 2.

The present exemplary embodiment is different from the above third exemplary embodiment in that a diffracting surface is formed on an entrance surface 3a1 of the collimator lens 3 of the incident optical system to reduce axial chromatic aberration caused by the collimator lens 3. No other change is made in the configuration, and optical operations are similar to those in the third exemplary embodiment and a similar effect is thereby gained. Table 5 shows numeric values of an optical scanning apparatus according to the fourth exemplary embodiment.

TABLE 5

| | r | d | N (670 nm) |
|---|---|---|---|
| Light source (light emitting point) | 0.0000 | 18.7970 | 0.0000 |
| Sub-scanning diaphragm | | 4.0000 | |
| Collimator lens* | -333.0000 | 3.9800 | 1.5796 |
| | -14.6247 | 75.4800 | 0.0000 |
| Cylindrical lens | 0.0000 | 3.0000 | 1.5273 |
| | 0.0000 | 33.0000 | 1.0000 |
| Main scanning diaphragm | | 22.5000 | |
| Deflecting surface | 0.0000 | 0.0000 | 1.0000 |

*Aspherical surface

| Aspherical coefficient | |
|---|---|
| A | 0.00E+00 |
| B | 2.48E-05 |
| C | 2.77E-08 |
| D | 0.00E+00 |
| E | 0.00E+00 |
| F | 0.00E+00 |
| G | 0.00E+00 |

| Collimator lens phase coefficient | |
|---|---|
| C1 | -8.70E-04 |
| C2 | 0.00E+00 |
| C3 | 0.00E+00 |
| C4 | 0.00E+00 |

The phase function of the collimator lens 3 in the present exemplary embodiment is given by the following formula:

$$\Phi(r) = \frac{2\pi}{m\lambda}(C_1 r^2 + C_2 r^4 + C_3 r^6 + C_4 r^8)$$

where m is the diffraction order (1 in the present exemplary embodiment), $$r = \sqrt{y^2 + z^2}$$

and
C1 to C4 are phase coefficients.

A diffracting grating is formed on the entrance surface 3a1 of the collimator lens 3, and if the design wavelength is $\lambda 0$, the wavelength used is $\lambda$, the diffraction order is m, and the refractive index is N, the diffraction power $\phi DO$ ($\phi_{Dof}$) and the refractive power $\phi ref$ can be calculated by the following formulas:

$$\phi_{ref} = \frac{N-1}{r}$$

$$\phi_{Dof} = -2mC_1 \frac{\lambda}{\lambda_0}$$

The collimator lens 3 in the present exemplary embodiment is produced by a molding process and the diffraction power $\phi DO$ and the refractive power $\phi ref$ on the lens surface of the collimator lens 3 forming a diffraction grating are configured to satisfy the above conditional equations (1) and (2) to reduce axial chromatic aberration. Accordingly, the refractive power $\phi ref$ and the diffraction power $\phi DO$ cancel out so that the collimator lens 3 that does not cause spot degradation with a smaller machining error can be produced even if the grating slope is linearly machined.

$\phi DO = 1.74 \times 10^{-3} (1/mm)$ $\phi ref = -1.74 \times 10^{-3} (1/mm)$

Figure 10:
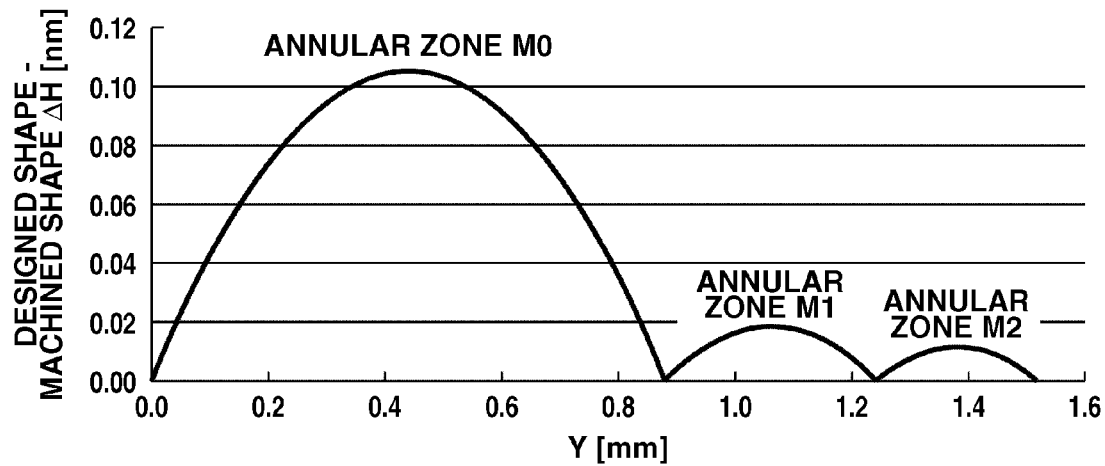
FIG. 10 is a graph illustrating machining errors of diffraction grating slopes on annular zones M0 to M2 of an optical element according to a fourth exemplary embodiment of the present invention.

FIG. 10 illustrates the machining errors ΔH from the annular zone M0 to the annular zone M2 in the present exemplary embodiment.

In the present exemplary embodiment, the machining error in the annular zone M0 is limited to 0.1 nm and that of the annular zone M1 to 0.02 nm by suitably setting the refractive power $\phi ref$ and the diffraction power $\phi DO$ on the entrance surface 3a1 of the collimator lens 3. Thus, the machining error in the annular zone M0 is limited to almost zero and, therefore, all slopes of the diffraction grating can be linearly machined so that the time to make a mold can significantly be shortened while improving accuracy of finishing.

As described above, a high-accuracy rotating symmetric lens whose axial chromatic aberration is corrected can be provided without increasing the number of lenses so that focusing fluctuations caused by variations in laser wavelength of multiple beams can be reduced.

Thus, in each of the exemplary embodiments, at least one optical system of first and second optical systems has at least one optical element having at least a surface where a diffracting surface composed of a diffraction grating whose sectional shape of the diffracting surface is linearly formed. Then, by optimizing the refractive power φref and the diffraction power φDO, a high-definition optical scanning apparatus with less spot degradation is obtained even if the sectional shape of a grating slope is linearly machined.

<Image Forming Apparatus>

Figure 12:
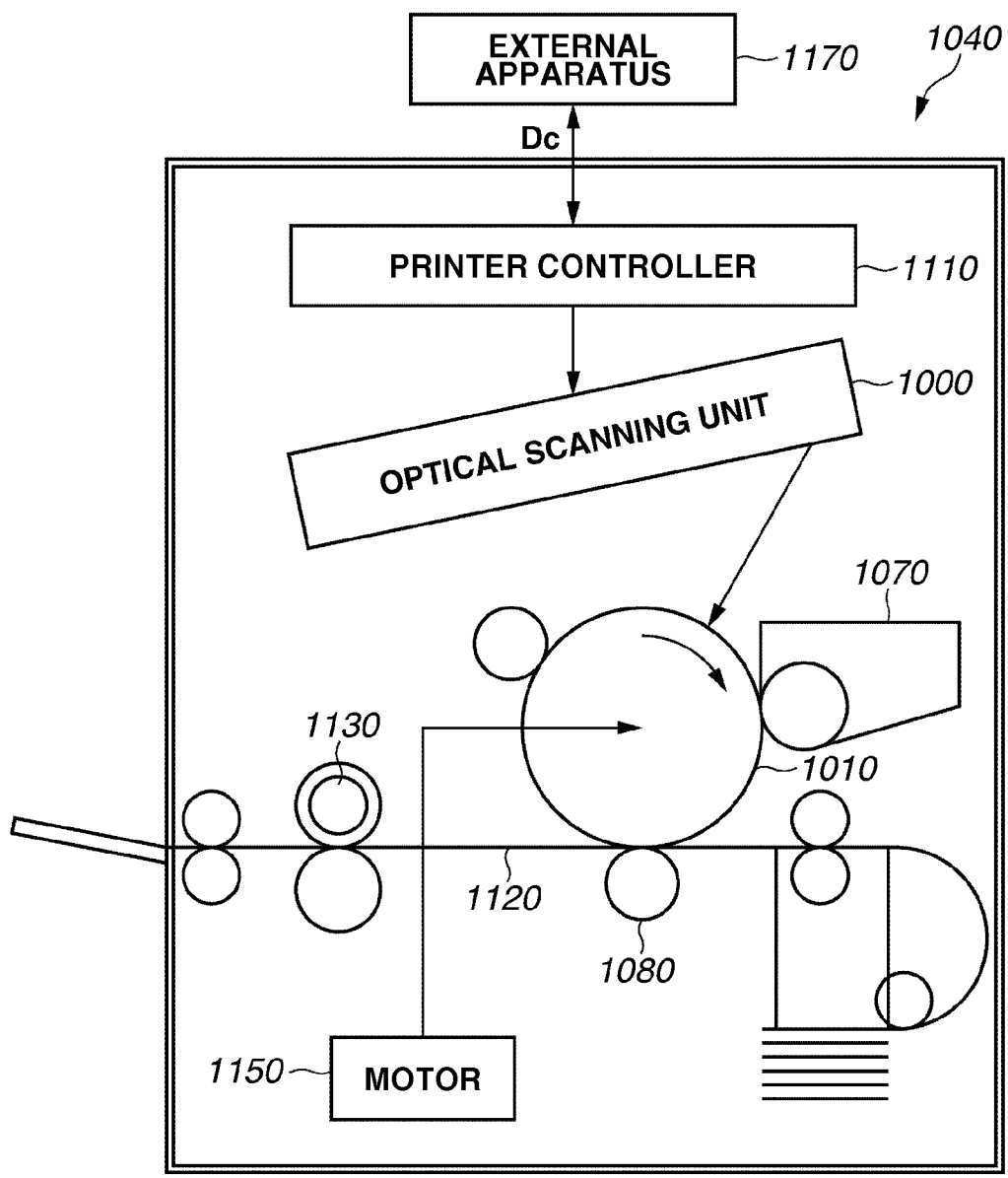
FIG. 12 is a sectional view of relevant portions of an image forming apparatus according to an exemplary embodiment of the present invention.

FIG. 12 is a sectional view illustrating relevant portions of an image forming apparatus cut along the sub-scanning direction according to an exemplary embodiment of the present invention. The image forming apparatus 1040 in the present exemplary embodiment includes a photosensitive member (photosensitive drum) 1010 arranged on a surface to be scanned and a developing unit 1070 that develops an electrostatic latent image formed on the photosensitive member 1010 by a light flux scanned by the optical scanning unit 1000 having a configuration shown in the first to fourth exemplary embodiments as a toner image. Further, the image forming apparatus 1040 includes a transfer unit (such as a transfer roller 1080) to transfer the developed toner image onto a sheet 1120, which is a transferred material, and a fixing device (such as a fixing roller 1130) that fixes the transferred toner image onto the sheet 1120.

Further, the image forming apparatus 1040 includes a printer controller 1110 that converts code data Dc input from an external apparatus 1170 into an image signal and inputs the image signal into the optical scanning unit 1000.

In addition to data conversion, the printer controller 1110 controls not only each unit in the image forming apparatus including a motor 1150, but also a drive motor and other units (not shown) in the optical scanning unit 1000.

The recording density of an image forming apparatus used in the present invention is not specifically limited, but in consideration of high quality being required, the configuration of the first to fourth exemplary embodiments of the present invention can achieve more effect in an image forming apparatus of 1,200 dpi or more.

Figure 13:
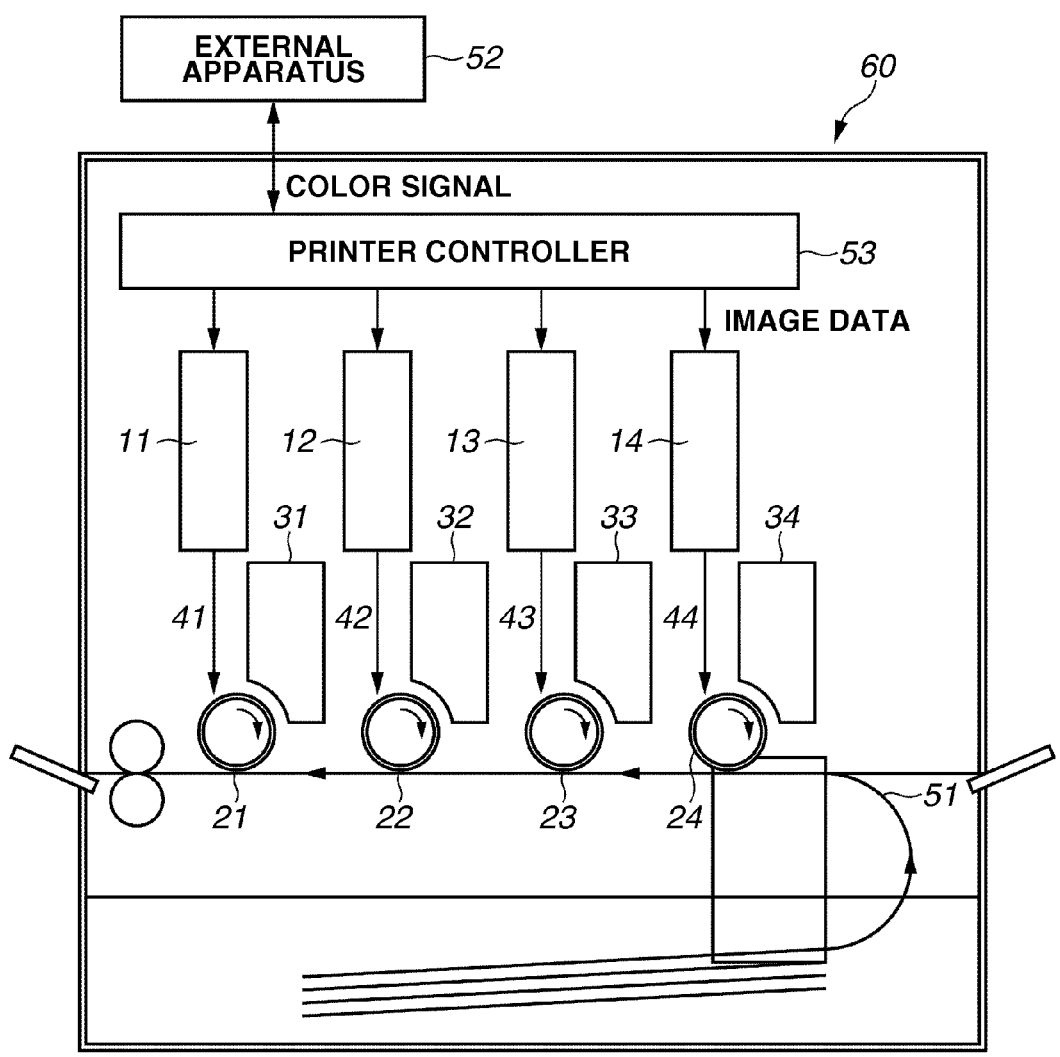
FIG. 13 is a sectional view of relevant portions of a color image forming apparatus according to an exemplary embodiment of the present invention.

FIG. 13 is a sectional view illustrating portions of a color image forming apparatus according to an exemplary embodiment of the present invention. The present exemplary embodiment is a tandem-type color image forming apparatus that records image information on the surface of a photosensitive drum, which is an image bearing member created by arranging four optical scanning apparatuses having the configuration shown in one of the first to fourth exemplary embodiments in parallel.

A color image forming apparatus 60 according to the present exemplary embodiment includes photosensitive drums 21, 22, 23 and 24, which are a plurality of image bearing members arranged on the surface to be scanned of optical scanning apparatuses 11, 12, 13, and 14 and forming images of mutually different colors C (cyan), M (magenta), Y (yellow), and B (black), respectively. The color image forming apparatus 60 further includes a developing device 31 for C (cyan), a developing device 32 for M (magenta), a developing device 33 for Y (yellow), a developing device 34 for B (black), and a transfer belt 51. The optical scanning apparatuses 11, 12, 13, and 14 emit light fluxes 41, 42, 43, and 44, respectively.

Further, the color image forming apparatus 60 includes a printer controller 53 that converts a color signal input from an external apparatus 52 into image data of different colors and inputs the image data into each of the optical scanning apparatuses 11 to 14.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-059170 filed Mar. 16, 2010, which is hereby incorporated by reference herein in its entirety.

What is claimed is:

1. An optical element used in an optical scanning apparatus, the optical element comprising:
a diffracting surface composed of a diffraction grating,
wherein the diffracting surface includes a diffraction grating whose sectional shape of the diffracting surface is linearly formed, and
wherein, if diffraction power in a main scanning direction on the diffracting surface received by an axial light flux is φDO and refractive power in the main scanning direction on a refracting surface on which the diffraction surface is formed received by the axial light flux is φref, the optical element satisfies the following conditions:

$$0 < \phi DO < 1.8 \times 10^{-3} (1/\text{mm}), \text{ and}$$

$$0.5|\phi DO| < |\phi ref| < 1.5|\phi DO|,$$

where the diffraction power φDO and the refractive power φref have opposite signs.

2. The optical element according to claim 1, wherein the sectional shape of the diffraction grating of an annular zone M1 of the diffracting surface is linearly formed.

3. The optical element according to claim 1, wherein the diffraction power φDO is positive and the refractive power φref is negative.

4. The optical element according to claim 1, wherein the optical element further satisfies the following conditions:

$$0 < \phi DO < 5 \times 10^{-4} (1/\text{mm}), \text{ and}$$
$$0.6|\phi DO| < |\phi ref| < 1.3|\phi DO|.$$

5. An optical scanning apparatus, comprising:
a light source unit;
a deflecting unit;
an incident optical system configured to guide a light flux emitted from the light source unit to a deflecting surface of the deflecting unit; and
an image forming optical system configured to cause the light flux from the deflecting unit to form an image on a surface to be scanned,
wherein an image forming optical element constituting the image forming optical system includes a diffracting surface composed of a diffraction grating,
wherein the diffracting surface includes the diffraction grating formed on a linear sectional shape of the diffracting surface, and
wherein, if diffraction power in a main scanning direction on the diffracting surface on which the diffraction grating is formed received by an axial light flux is φDO and refractive power in the main scanning direction on a refracting surface received by the axial light flux is φref, the image forming optical element satisfies the following conditions:

$$0 < \phi DO < 1.8 \times 10^{-3} (1/\text{mm}), \text{ and}$$

$$0.5|\phi DO| < |\phi ref| < 1.5|\phi DO|,$$

where the diffraction power φDO and the refractive power φref have opposite signs.

6. The optical scanning apparatus according to claim 5, wherein the sectional shape of the diffraction grating of an annular zone M1 of the diffracting surface is linearly formed.

7. The optical scanning apparatus according to claim 5, wherein the diffraction power $\phi DO$ is positive and the refractive power $\phi ref$ is negative.

8. The optical scanning apparatus according to claim 5, wherein the image forming optical element further satisfies the following conditions:

$$0 < \phi DO < 5 \times 10^{-4} (1/\text{mm}), \text{ and}$$
$$0.6|\phi DO| < |\phi ref| < 1.3|\phi DO|.$$

9. An image forming apparatus, comprising:
the optical scanning apparatus according to claim 5;
a photosensitive member arranged on the surface to be scanned;
a developing device configured to develop an electrostatic latent image formed on the photosensitive member by a light flux scanned in the optical scanning apparatus as a toner image;
a transfer device configured to transfer the developed toner image to a transferred material; and
a fixing device configured to fix the transferred toner image to the transferred material.

10. An image forming apparatus, comprising:
the optical scanning apparatus according to claim 5; and
a printer controller configured to convert code data input from an external apparatus into an image signal and to input the image signal to the optical scanning apparatus.

\* \* \* \* \*